United States Patent
Ouellette

(10) Patent No.: US 9,810,556 B2
(45) Date of Patent: Nov. 7, 2017

(54) APPARATUS FOR MEASURING OPTICAL SIGNALS FROM MULTIPLE OPTICAL FIBER SENSORS

(71) Applicant: François Ouellette, Stanstead (CA)

(72) Inventor: François Ouellette, Stanstead (CA)

(*) Notice: Subject to any disclaimer, the term of this patent is extended or adjusted under 35 U.S.C. 154(b) by 74 days.

(21) Appl. No.: 14/677,470

(22) Filed: Apr. 2, 2015

(65) Prior Publication Data

US 2015/0285683 A1  Oct. 8, 2015

Related U.S. Application Data

(60) Provisional application No. 61/973,975, filed on Apr. 2, 2014.

(51) Int. Cl.
*G01D 5/353* (2006.01)
*G01J 3/02* (2006.01)
*G01J 3/45* (2006.01)
*G01J 3/18* (2006.01)

(52) U.S. Cl.
CPC ..... *G01D 5/35354* (2013.01); *G01D 5/35383* (2013.01); *G01J 3/0218* (2013.01); *G01J 3/45* (2013.01); *G01J 3/1895* (2013.01)

(58) Field of Classification Search
None
See application file for complete search history.

(56) References Cited

U.S. PATENT DOCUMENTS

| | | | | |
|---|---|---|---|---|
| 5,757,487 A * | 5/1998 | Kersey | | G01D 5/35383 356/478 |
| 5,991,026 A * | 11/1999 | Kluth | | G01D 5/35383 250/227.27 |
| 7,127,132 B1 * | 10/2006 | Moslehi | | G01D 5/35303 385/12 |
| 2002/0025097 A1 * | 2/2002 | Cooper | | G01D 5/35383 385/12 |
| 2004/0046109 A1 | 3/2004 | Chen | | |
| 2004/0245441 A1 * | 12/2004 | Pieterse | | G01D 5/35303 250/227.14 |
| 2005/0269489 A1 | 12/2005 | Taverner | | |

(Continued)

FOREIGN PATENT DOCUMENTS

GB   2464477 A  *  4/2010

OTHER PUBLICATIONS

Written opinion for PCT/CA2015/000232, mailing date Jul. 22, 2015.*
International Search Report PCT/CA2015/000232 (2015-07-22).

*Primary Examiner* — Mike Stahl
(74) *Attorney, Agent, or Firm* — C. Marc Benoit

(57) ABSTRACT

There is described a sensor apparatus. It comprises an interrogator comprising a light source emitting pulses having a wavelength about an average wavelength; and a fiber Bragg grating (FBG) arrangement. The arrangement comprises a FBG sensor array comprising a plurality of FBG sensors on an optical fiber and being for reflecting the pulses, thereby producing reflected pulses at each one of the FBG sensors. FBG sensors of a given FBG sensor array have a spatial separation therebetween which is sufficient to allow, at a receiver, a temporal discrimination between the reflected pulses produced by each one of the FBG sensors. The FBG sensor array has a spectral reflection window which comprises the average wavelength.

8 Claims, 12 Drawing Sheets

(56) References Cited

U.S. PATENT DOCUMENTS

| | | |
|---|---|---|
| 2007/0024857 A1 | 2/2007 | Menezo |
| 2010/0085572 A1 | 4/2010 | Hartog |
| 2011/0181871 A1 | 7/2011 | Childers |
| 2013/0140445 A1* | 6/2013 | Yoshida ............... G01B 11/165 250/227.18 |
| 2014/0239166 A1* | 8/2014 | Hjort ................... G01M 5/0016 250/227.18 |
| 2015/0369731 A1* | 12/2015 | Taverner ............ G01N 21/4788 356/445 |

* cited by examiner

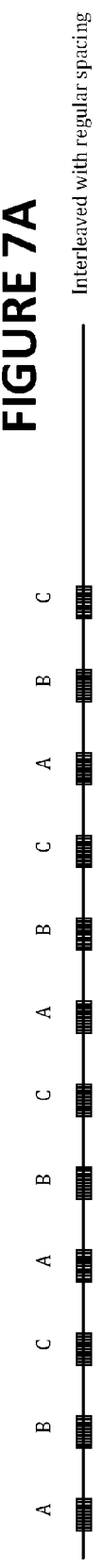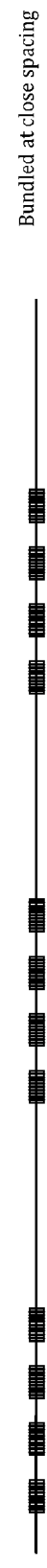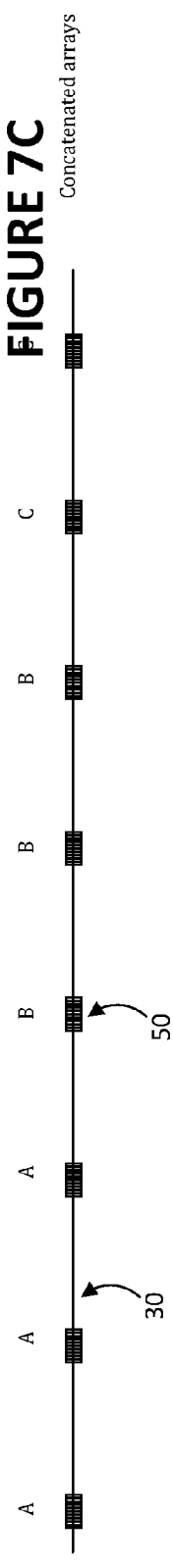

APPARATUS FOR MEASURING OPTICAL SIGNALS FROM MULTIPLE OPTICAL FIBER SENSORS

CROSS-REFERENCE TO RELATED APPLICATIONS

This application claims priority from U.S. provisional patent application No. 61/973,975 filed on Apr. 2, 2014.

BACKGROUND (a) Field

The subject matter disclosed generally relates to fiber optics. More precisely, it relates to fiber Bragg grating sensors.

(b) Related Prior Art

Fiber Bragg gratings (FBGs) have proven to be useful devices for monitoring physical parameters including, but not limited to, temperature, strain, pressure, vibrations. FBGs are fabricated by inducing a permanent periodic refractive index change in the core of an optical fiber over a given length, typically a few millimeters. Such devices reflect light propagating in the optical fiber over a narrow wavelength range. The reflection spectrum typically has a narrow peak centered at a wavelength equal to twice the spatial period of the grating multiplied by the refractive index of the fiber. The width of the reflection spectrum is inversely proportional to the grating length. To use the FBG as a sensor, a transducing arrangement either changes the temperature or stretches the section of fiber containing the grating, both effects resulting in a change of the effective period of the grating, and therefore of the central wavelength of the reflected light. A measurement of that central wavelength can thus be correlated with the parameter being measured (the measurand). Such measurement can be made remotely by launching light into the optical fiber at a distance, and detecting and analyzing the spectral characteristics of the reflected light. Since the transmission loss of optical fiber is very low, the measurement apparatus can be located far away from the FBG sensor.

One advantage of FBGs as sensor devices is that the optical fiber is immune to electromagnetic interference, making possible their use in environments where electrical or electronic sensors would not perform well.

However, one of the main advantages of FBGs is that, due to their narrow spectral signature, multiple FBGs of different periods can be written at different locations along a single strand of optical fiber, and each FBG can be identified by its spectral signature. Thus multiple spatial locations can be sensed simultaneously with a single optical fiber by measuring the peak wavelength of the FBG's. Such a technique to integrate multiple FBG sensors with various central wavelengths along one optical fiber is termed "Wavelength Division Multiplexing", or WDM.

Typically, the method used to monitor the central wavelength of the FBG sensors is to use a tunable optical source that repeatedly scans a broad wavelength range. The reflected light is collected via an optical circulator or an optical coupler located between the source and the FBGs, and then sent onto a photodetector. The peaks in the reflected light therefore correspond to the peak reflected wavelength of each FBG. Alternately, a broadband optical source can be used, with the central wavelengths of all the FBG sensors falling within the source spectrum. The reflected light is then sent into a spectrometer, and the reflected peaks are determined by analyzing the spectrometer data.

For WDM interrogation, all the FBG sensors along the optical fiber are made to have central wavelengths within the spectral range of either the tunable source or the broadband source. On the other hand, the wavelength spacing between each FBG must be large enough to account for the maximum spectral shift of each FBG under the influence of the parameter to be measured, so that there is no possibility of overlap between individual spectra, which would lead to ambiguous or erroneous measurements. One can therefore define a "spectral window", which is the range of central wavelengths that one FBG sensor is likely to span given the range of the measurand. As a consequence, the maximum number of FBG sensors that can be interrogated by a given optical source is approximately equal to the spectral width or span of the source divided by the spectral width of the spectral windows of individual sensors.

For example, the central wavelength of a typical FBG will shift in proportion to strain. Thus if the strain to be measured is as high as $10,000\mu\varepsilon$, the maximum wavelength shift would be approximately 10 nm for a FBG with a central wavelength of 1550 nm. If the tunable source has a range of 60 nm, as is typical of commercial sources, then the maximum number of sensors that can be interrogated with that source is 6, given by 60 nm divided by a spectral window of 10 nm.

Some applications would benefit from a much larger number of sensors in the same fiber. For example, spatially resolved temperature or strain measurements on pieces of equipment such as wind turbine blades, or generator rotors, would benefit from having a number of sensors in the range of 100 or more.

One way of augmenting the number of sensors is to use the time domain as well as the wavelength domain to discriminate between sensors. Such schemes are labeled "Time-division-multiplexing", or TDM. In a TDM scheme, the light source used to interrogate the gratings is pulsed, and the pulse duration is made to be shorter than the time delay for light travelling from one grating to the next one. If the maximum reflectivity of each grating is small enough (typically 1%-2%), then only the first reflection from each grating is significant, and the reflected signal coming from light that has bounced multiple times on the grating reflectors is negligible. Therefore each pulse generates a series of echoes that can be temporally discriminated. As with WDM interrogation schemes, the source can either be tunable or broadband. The difference is that the detection apparatus must have a response time that is short enough to differentiate the reflections from the various gratings. Therefore, multiple FBG sensors can be used within a single spectral window. The total number of sensors is thus that of the WDM arrangement multiplied by the number of sensors that can be temporally discriminated.

Even though such combination TDM-WDM interrogation schemes can use tunable sources, most of the proposed prior art uses broadband optical sources. That is because the broadband source has all the wavelengths present at all times to interrogate the sensors, which means that the response time is not limited by the source. A tunable source always takes some time to scan the entire wavelength span, and that time ultimately limits the response time of the system.

When using a broadband optical source, the central wavelength of the grating sensors is most often determined by processing the reflected light with the use of spectrally sensitive filters, such as unbalanced interferometers, or ratiometric arrangements.

Prior art describing TDM and WDM sensing apparatus include patent publications WO2013001268, CA2379900A1, US20100128258, WO2004056017, all of which use a broadband optical sources, and various arrangements to gate the reflected signals, and detect their wavelengths.

Niewczas (WO2013001268A2) describes a system using a broadband light source, and interferometers to measure the wavelength of the reflected light. Cooper and Smith (CA2379900A1) also use a pulsed broadband optical source, and an optical modulator to gate the reflected pulses. Volanthen and Lloyd (US20100128258) also use a pulsed broadband source.

Everall and Lloyd (WO2004056017) describe a TDM system that uses a broadband light source, which is pulsed and gated with a semiconductor optical amplifier. Wavelength determination is accomplished with an optical filter having known transmission characteristics, or alternately with an optical spectrum analyzer or a wavemeter. Whilst the use of a semiconductor amplifier results in a larger optical power, the combined cost of the source, optical amplifier, and wavelength measuring apparatus is still important.

One difficulty when using a broadband optical source is that the optical power is distributed over the entire source spectrum. Thus the actual power reflected by an individual FBG sensor is only a small fraction of the total source power. In actual fact, most of the source power is wasted, as it is not reflected by any sensor. Typical broadband sources, such as light emitting diodes, or superluminescent diodes, only have a total power of the order of 1 mW, after coupling into a single-mode optical fiber. The low power of the reflected signal makes it difficult to obtain a large enough signal-to-noise ratio. The other difficulty with broadband sources is that the number of spectral windows is still limited by the total spectral width of the source.

All in all, most prior art suffer from an additional drawback: the cost of the system. Optical amplifiers, fiber interferometers, or spectrum analyzers are relatively expensive devices. The high cost of these systems has so far impeded their widespread adoption. One other factor affecting the cost of the apparatus is that it is an all-or-nothing instrument. That is, the instrument is capable of measuring a high number of gratings at a given cost, and there is no way of paying less if the number of sensors required is smaller than the ultimate capability of the instrument.

There is therefore a need for improved optical fiber sensor arrangements.

SUMMARY

According to an aspect of the invention, there is provided a sensor apparatus comprising an interrogator comprising light sources, each one of the light sources emitting pulses having a wavelength about a respective average wavelength of the each one of the light sources; and FBG sensor arrays, each one of the FBG sensor arrays corresponding to one of the light sources and comprising a plurality of FBG sensors on an optical fiber and being for reflecting the pulses, wherein FBG sensors of a given FBG sensor array have a spatial separation therebetween which is sufficient to allow, at a receiver, a temporal discrimination between reflected pulses produced by each one of the FBG sensors of a given FBG sensor array; wherein each one of the FBG sensor arrays has a respective spectral reflection window which comprises the respective average wavelength of the corresponding one of the light sources; wherein the respective average wavelengths of the light sources have a spectral separation therebetween which is sufficient to allow, at the receiver, a spectral discrimination between reflected pulses from each one of the FBG sensor arrays.

According to an embodiment, each one of the light sources is configured to emit pulses at a first respective wavelength and a second respective wavelength about the respective average wavelength of the each one of the light sources.

According to an embodiment, wherein the receiver comprises a processor adapted, for each one of the FBG sensor arrays corresponding to one of the light sources and based on prior knowledge of a reference reflection spectrum of the each one of the FBG sensors, to use the reflected pulses from the first respective wavelength and the second respective wavelength to unambiguously determine a shift of the peak of an actual reflection spectrum of the each one of the FBG sensors.

According to an embodiment, the FBG sensor arrays are provided on a plurality of optical fibers, each one of the optical fibers holding a given number of FBG sensor arrays.

According to an embodiment, there is further provided a multiplexer for connecting the plurality of optical fibers thereto, the interrogator being optically coupled to the multiplexer for sending the pulses to the plurality of optical fibers.

According to another aspect of the invention, there is provided a sensor apparatus comprising: —an interrogator comprising a light source emitting pulses having a wavelength about an average wavelength; and—a fiber Bragg grating (FBG) arrangement comprising a FBG sensor array comprising a plurality of FBG sensors on an optical fiber and being for reflecting the pulses, thereby producing reflected pulses at each one of the FBG sensors, wherein FBG sensors of a given FBG sensor array have a spatial separation therebetween which is sufficient to allow, at a receiver, a temporal discrimination between the reflected pulses produced by each one of the FBG sensors; wherein the FBG sensor array has a spectral reflection window which comprises the average wavelength.

According to an embodiment, the light source is for emitting pulses at a first wavelength and a second wavelength about the average wavelength.

According to an embodiment, the receiver comprises a processor adapted, based on prior knowledge of a reference reflection spectrum of the plurality of FBG sensors, to use the reflected pulses from the first respective wavelength and the second respective wavelength to unambiguously determine an actual reflection spectrum of each one of the plurality of FBG sensors.

According to another aspect of the invention, there is provided an apparatus for measuring an optical signal interacting with a fiber Bragg grating (FBG) sensor arrangement, the apparatus comprising: an array of FBG sensors located along a single optical fiber, each one of the FBG sensors being for operating within a given spectral window, the FBG sensors being separated by given distances along the single optical fiber, each FBG sensor in the array having a known reflection spectrum which can shift to an actual reflection spectrum under given conditions, thereby defining a shift; and an interrogator connected to the single optical fiber and comprising a module interrogating the array of FBG sensors with more than one discrete wavelengths comprised in the given spectral window, the interrogator to receive reflections of the optical signal on the FBG sensors at the more than one discrete wavelengths for determining the shift of each FBG sensor in the array.

According to an embodiment, the module interrogates the array of FBG sensors using two discrete wavelengths comprised in the given spectral window.

According to an embodiment, the given distances by which the FBG sensors are separated account for time discrimination between the reflections of the optical signal received by the interrogator.

According to an embodiment, there is further provided a processor operatively connected to the interrogator, and adapted to perform instructions for determining the given conditions under which the known reflection spectrum shifted to the actual reflection spectrum for each FBG sensor in the array.

According to another aspect of the invention, there is provided apparatus for measuring an optical signal interacting with a fiber Bragg grating (FBG) sensor arrangement, the apparatus comprising: a plurality of arrays of FBG sensors located along a plurality of optical fibers branching out from a main optical fiber, each one of the plurality of arrays having a distinct spectral window and comprising FBG sensors operating within the distinct spectral window having a known reflection spectrum that can undergo a shift under given conditions, thereby defining a shift for each FBG sensor; an interrogator connected to the main optical fiber and comprising a plurality of modules, each one of the modules interrogating a corresponding one of the arrays of FBG sensors using more than one pulses in the distinct spectral window of the corresponding one of the arrays of FBG sensors, the interrogator to receive the optical signal as reflected by the FBG sensors and indicative of the shift for each FBG sensor.

According to an embodiment, each one of the modules interrogating a corresponding one of the arrays of FBG sensors uses pulses of more than one discrete wavelengths in the distinct spectral window of the corresponding one of the arrays of FBG sensors, in order to unambiguously assess the shift of the known reflection spectrum of each FBG sensor.

According to an embodiment, the FBG sensors of a given array are separated by given distances along the one of the plurality of optical fibers on which the FBG sensors are located to enable temporal discrimination of the pulses of the optical signal as reflected by the FBG sensors.

According to an embodiment, there is further provided a multiplexer located between the interrogator and the plurality of arrays, the multiplexer for combining outputs of the multiple modules into the main optical fiber.

According to another aspect of the invention, there is provided an apparatus for measuring an optical signal in a fiber Bragg grating (FBG) sensor arrangement, the apparatus comprising: —an array of FBG sensors located along a single optical fiber, each one of the FBG sensors having a known reflection spectrum surrounding a peak reflection wavelength that shifts under changing conditions; and—an interrogator connected to the single optical fiber and comprising: —a module adapted for interrogating the array of FBG sensors using an optical signal comprising pulses emitted at either a first wavelength ($\lambda_+$) or a second wavelength ($\lambda_-$); and—a receiver adapted to detect the pulses as reflected by the array of FBG sensors, namely reflected pulses, for determining a shift of the peak reflection wavelength for at least one of the FBG sensors.

According to an embodiment, there are further provided additional arrays of FBG sensors located along additional optical fibers, each one of the additional arrays of FBG sensors having a distinct and unique peak reflection wavelength, the interrogator further comprising additional modules adapted for interrogating the additional arrays of FBG sensors using a distinct optical signal comprising pulses emitted at either a first wavelength ($\lambda_+$) or a second wavelength ($\lambda_-$), wherein $\lambda_+$ and $\lambda_-$ are distinct and unique for each one of the additional modules.

According to an embodiment, the receiver comprises a photodiode for converting the optical signal into an electric signal representative of the optical signal.

According to an embodiment, the receiver comprises an amplifier for amplifying the electric signal.

According to an embodiment, the receiver is for operative communication with a processing device for processing an electric signal outputted by the receiver.

According to an embodiment, based on the shift of the peak reflection wavelength, the processing device is adapted for determining a measurand acting on at least one of the FBG sensors by processing the electric signal outputted by the receiver.

According to an embodiment, the processing device is adapted for determining at least one of a temperature and a strain acting on at least one of the FBG sensors.

According to an embodiment, there is further provided a rotary joint provided between the interrogator and the single optical fiber for enabling a rotation of the single optical fiber with respect to the interrogator.

According to an embodiment, the interrogator comprises a light source which comprises a laser diode.

According to an embodiment, there is further provided a cooling element for maintaining the temperature of the light source.

According to an embodiment, the cooling element comprises a thermoelectric cooling element.

According to an embodiment, there is further provided a temperature sensor for measuring the temperature of the light source and thereby informing the cooling element whether it is necessary to cool down the light source.

According to an embodiment, there is further provided a reference photodiode for monitoring the optical signal.

According to an embodiment, the reference photodiode is for monitoring a long-term wavelength drift of the light source.

According to an embodiment, there is further provided a fiber coupler for directing the pulse emitted from the module to the FBG sensor arrangement and for directing the reflected pulses from the FBG sensor arrangement to the receiver, the fiber coupler having a second branch, wherein the reference photodiode is installed on the second branch of the fiber coupler.

According to an embodiment, there is further provided a fiber coupler for directing the pulse emitted from the module to the FBG sensor arrangement and for directing the reflected pulses from the FBG sensor arrangement to the receiver.

According to another aspect of the invention, there is provided a method for measuring an optical signal reflected by a fiber Bragg grating (FBG) sensor arrangement comprising FBG sensors, the method comprising the steps of: —sending to the FBG sensor arrangement from a light source: —at least one pulse at a first wavelength; and—at least one pulse at a second wavelength, each one of the pulses separated by at least a time interval T, each one of the pulses being shorter than the time interval T, for discriminating reflected pulses from each one of the FBG sensors; —for at least one of the FBG sensors, receiving and measuring an intensity of: —the reflected pulse of the at least one pulse at the first wavelength; and—the reflected pulse of the at least one pulse at the second wavelength, —calculating a peak reflection wavelength of the at least one of the FBG sensors.

According to an embodiment, receiving and measuring an intensity is performed by a receiver.

According to an embodiment, the receiver is adapted to respond fast enough to enable discrimination of reflected pulses from each one of the FBG sensors.

According to an embodiment, the time interval T is the time interval between which reflected pulses from adjacent FBG sensors are received at the receiver.

According to an embodiment, there is further provided determining a shift of the peak reflection wavelength with respect to a reference value of the peak reflection wavelength.

According to an embodiment, there is further provided using the shift of the peak reflection wavelength to determine the value of a measurand acting on the at least one of the FBG sensors.

According to an embodiment, there is further provided monitoring the wavelength of the light source using a reference photodiode.

According to an embodiment, there is further provided measuring the temperature of the reference photodiode using an independent temperature sensor.

According to an embodiment, there is further provided controlling the temperature of the light source.

According to an embodiment, controlling the temperature of the light source comprises cooling down the light source using a thermoelectric cooling element.

According to an embodiment, controlling the temperature of the light source is based on an input from a temperature sensor measuring if the temperature of the light source deviates from a specified value.

According to an embodiment, the at least one pulse at a first wavelength is sent at a first intensity and the at least one pulse at a second wavelength is sent at a second intensity, wherein measuring the intensity of the reflected pulses comprising determining an extinction of a respective intensity of each one of the pulses.

According to an embodiment, sending pulses to the FBG sensor arrangement comprises sending to FBG sensors provided on a plurality of optical fibers.

According to another aspect of the invention, there is provided a method for interrogating a fiber Bragg grating (FBG) sensor arrangement comprising FBG sensors, the method comprising the steps of:
sending to FBG arrays of the FBG sensor arrangement a plurality of optical signals, each one of the optical signals for interacting with the FBG sensors of a single FBG array, each one of the optical signals comprising: at least one pulse at a respective first wavelength; and at least one pulse at a respective second wavelength, each one of the optical signals being characterized by a respective average wavelength about which the respective first and second wavelengths of the each one of the optical signals are provided; for at least one of the FBG sensors of the FBG arrays, receiving and measuring an intensity of: a reflected pulse of the at least one pulse at the first wavelength; and a reflected pulse of the at least one pulse at the second wavelength; and calculating a peak reflection wavelength for the at least one of the FBG sensors.

According to an embodiment, for each one of the optical signals, each one of the pulses is separated by at least a respective time interval T, wherein each one of the pulses is shorter than respective the time interval T.

According to an embodiment, receiving and measuring an intensity is performed by a receiver which responds fast enough to be able to discriminate reflected pulses from each one of the FBG sensors.

According to an embodiment, each one of the FBG arrays is characterized by a respective spectral window shared by all the FBG sensors provided in the each one of the FBG arrays, each one of the FBG arrays being for interrogation by a corresponding one of the optical signals.

According to an embodiment, between the respective average wavelengths of each one of the optical signals, there is a spectral separation larger than the respective spectral window of each one of the FBG arrays to enable a spectral discrimination of each FBG array.

BRIEF DESCRIPTION OF THE DRAWINGS

Further features and advantages of the present disclosure will become apparent from the following detailed description, taken in combination with the appended drawings, in which:

FIGS. 7a-7C are diagrams illustrating various embodiments of FBG array configurations.

It will be noted that throughout the appended drawings, like features are identified by like reference numerals.

DETAILED DESCRIPTION

This disclosure pertains to an apparatus for measuring multiple FBG sensors using a combination of WDM and TDM techniques.

The present description describes embodiments which are based on a modular system, where each module is made of very low cost, standard components. Thus the user can build an instrument at a cost that is proportional to the number of sensors required. Furthermore, modularity coupled with standardization of the components allows for a reduction of manufacturing costs.

There is described herein a technique to measure the central wavelength of the FBG sensors that is fundamentally different from known prior art techniques. Whereas most of the prior art aims to find the wavelength of peak reflectivity of the grating, this description uses the knowledge of the FBG spectral profile to determine the location of the FBG central wavelength relative to the fixed wavelength of the interrogating source.

Figure 1A:
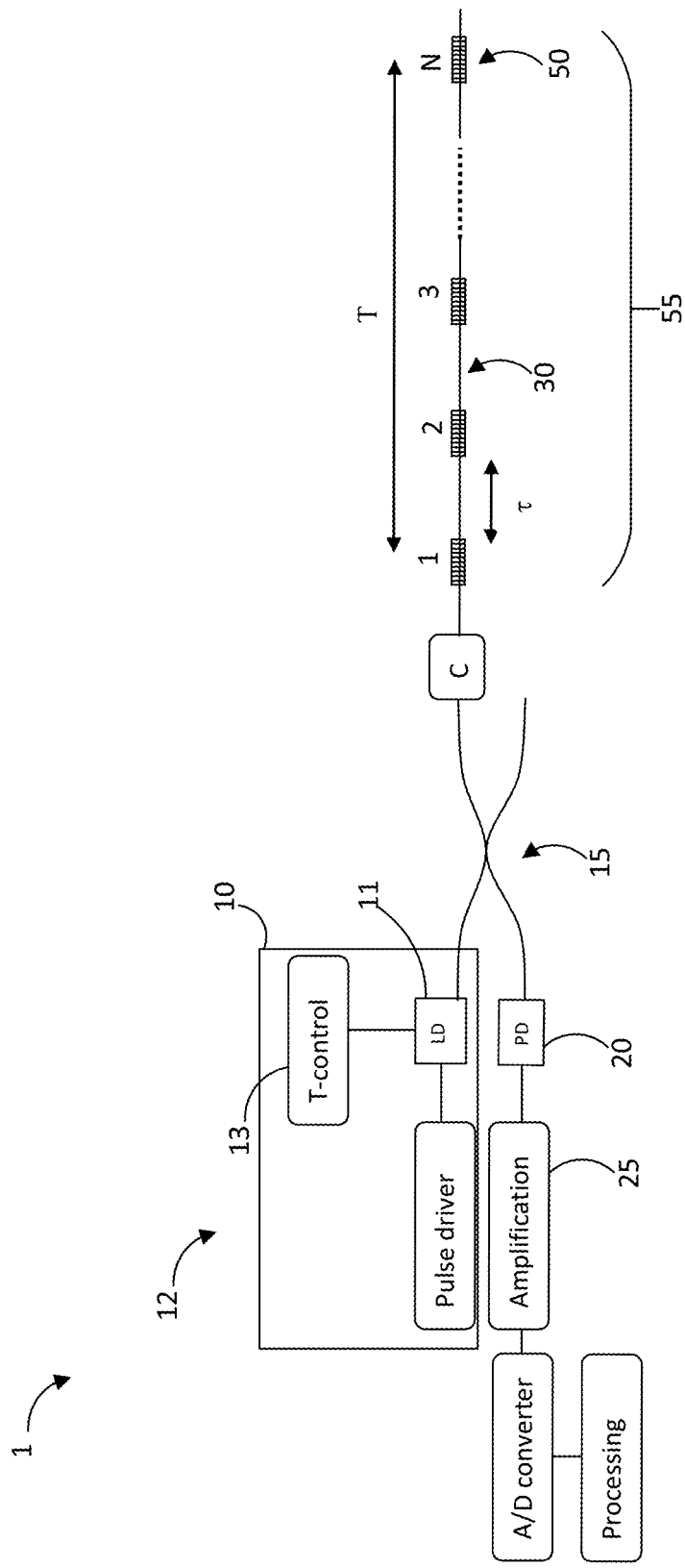
FIG. 1A is a diagram illustrating the apparatus comprising a single module interrogating a serial array of FBG sensors located along a single optical fiber, according to an embodiment.

Now referring to FIG. 1A, there is shown an apparatus 1 which comprises a plurality of FBG sensors 50 located along one single optical fiber 30, or along multiple optical fibers 30 branching out from a main fiber (see FIGS. 1B, 2A and 2B), the plurality of FBG sensors 50 being comprised in one or multiple sensor arrays 55. Each sensor array 55 is composed of a number N of FBG sensors 50 operating within the same spectral window, separated by regular or irregular but known distances from the source along one optical fiber 30, as shown in FIG. 1A. Each sensor array 55 operates within a distinct spectral window. Each FBG sensor 50 has a known and well characterized reflection spectrum. Since all FBG sensors 50 from an array 55 are on the same optical fiber 30, the array 55 can be defined as a serial array, which is different from a parallel array, as described below.

Figure 1B:
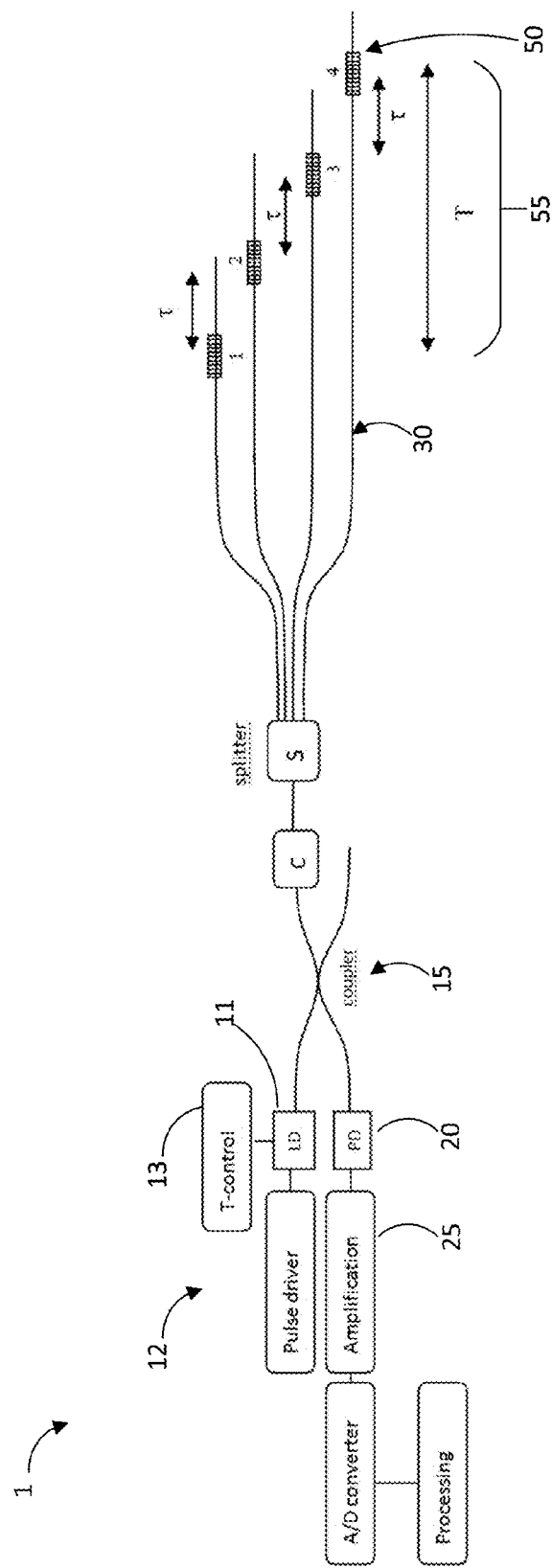
FIG. 1B is a diagram illustrating the apparatus comprising a single module interrogating a parallel array of FBG sensors distributed along a plurality of optical fibers, according to an embodiment.

According to another embodiment shown in FIG. 1B, each sensor array 55 comprises FBG sensors 50 distributed on a plurality of optical fibers 30, defining a parallel array. Each parallel array is composed of a number N of FBG sensors (N=4 in FIG. 1B) located on separate optical fibers branching out from a single optical fiber, and located at incremental distances from the source. This increment is either regular, or irregular but known. The same principle applies in FIG. 2B, in which a plurality of modules is used, as described further below.

The apparatus 1 further comprises: an interrogator 12 comprising one or multiple individual modules 10, each module 10 interrogating one of the sensor arrays 55 of FBG sensors 50 operating in one spectral window; an optical wavelength division multiplexer 60 combining the outputs of the multiple modules 10 into a single optical fiber 30, if more than one module 10 is used (see FIG. 2); optional spectral add/drop multiplexers 65 that can separate the outputs of the multiple modules 10 from the main optical fiber 30 into separate branches of optical fiber, either one channel at a time, or multiple channels at a time (see FIG. 2); and one or more optional reference FBG sensor (not shown) in each sensor array 55, such a reference FBG sensor being at known strain and temperature.

Figure 6A:
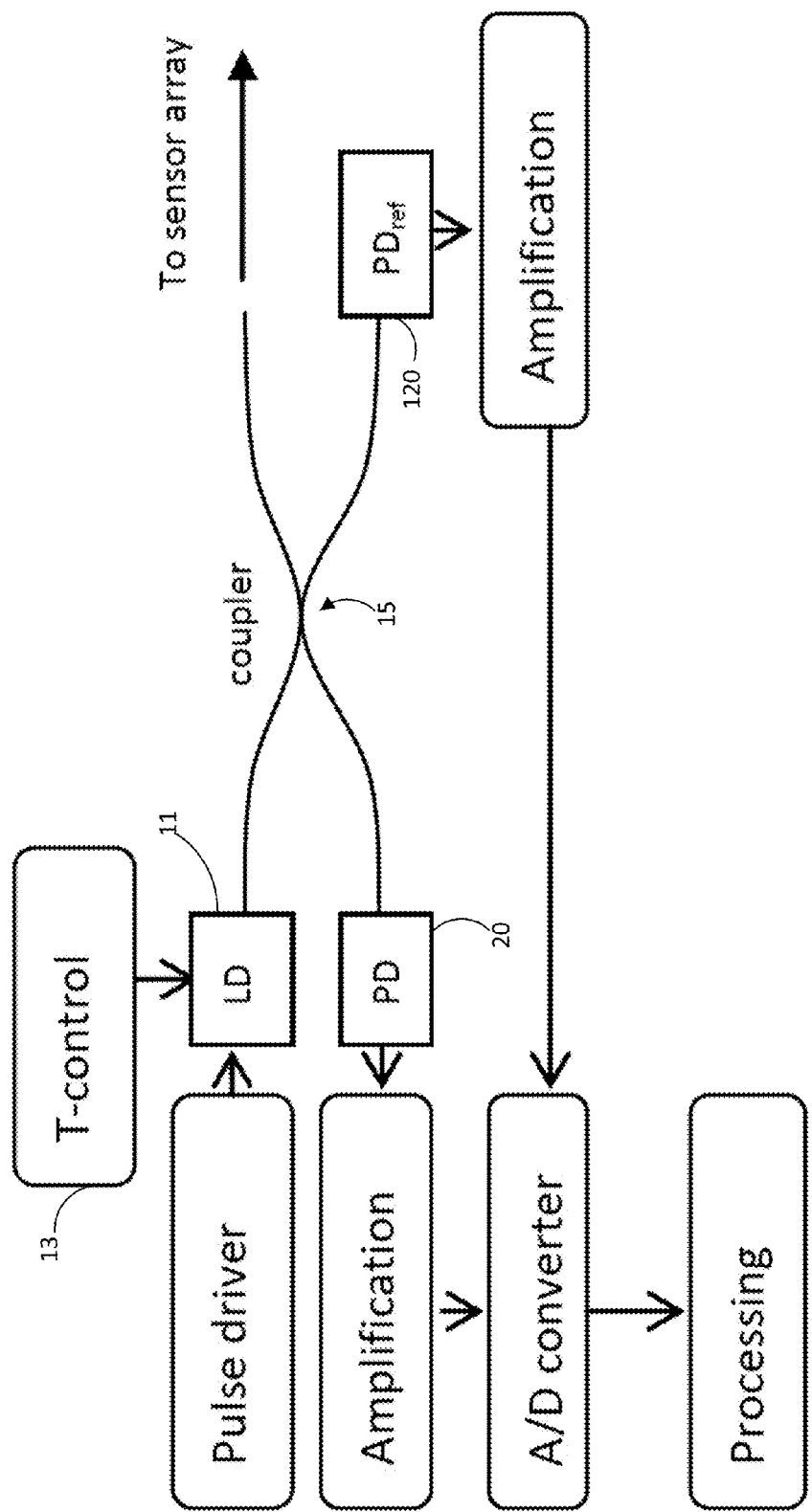
FIGS. 6A-6C are diagrams illustrating the apparatus comprising a photodiode for monitoring the emitted pulses, according to various embodiments.
Figure 6B:
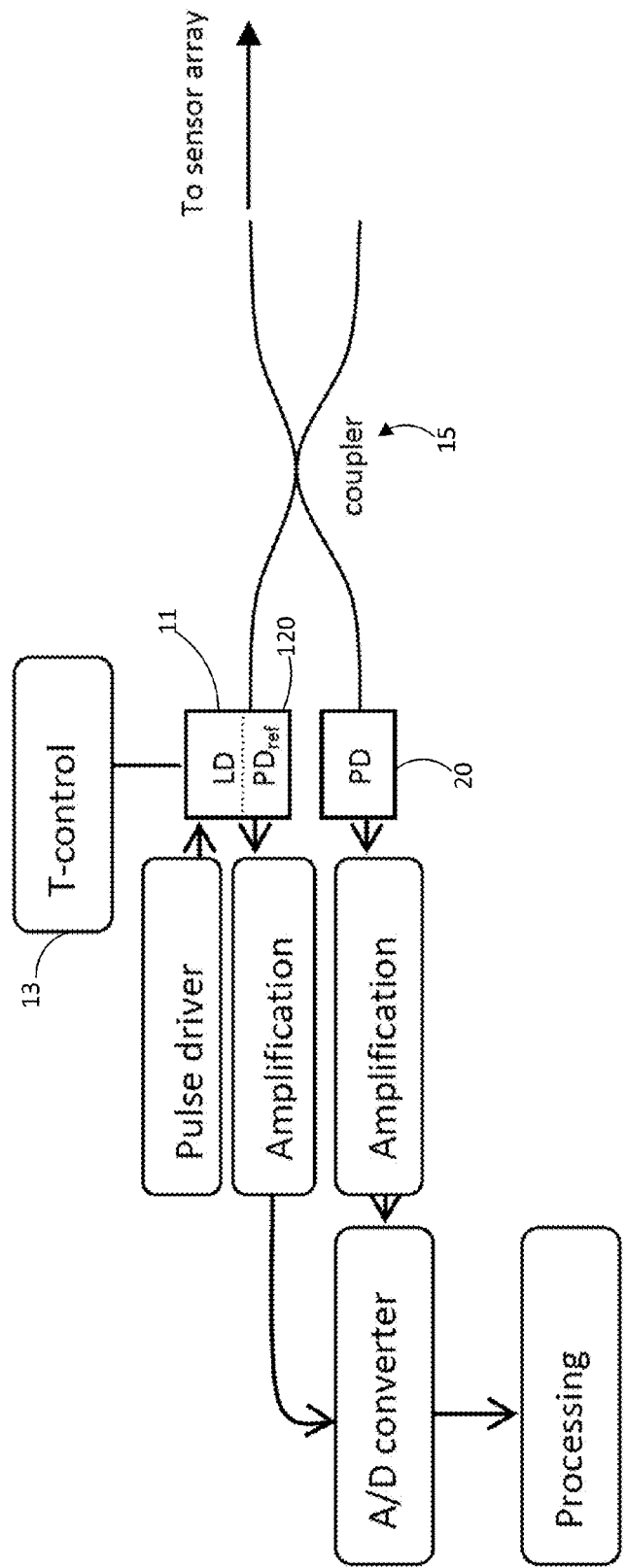
Figure 6C:
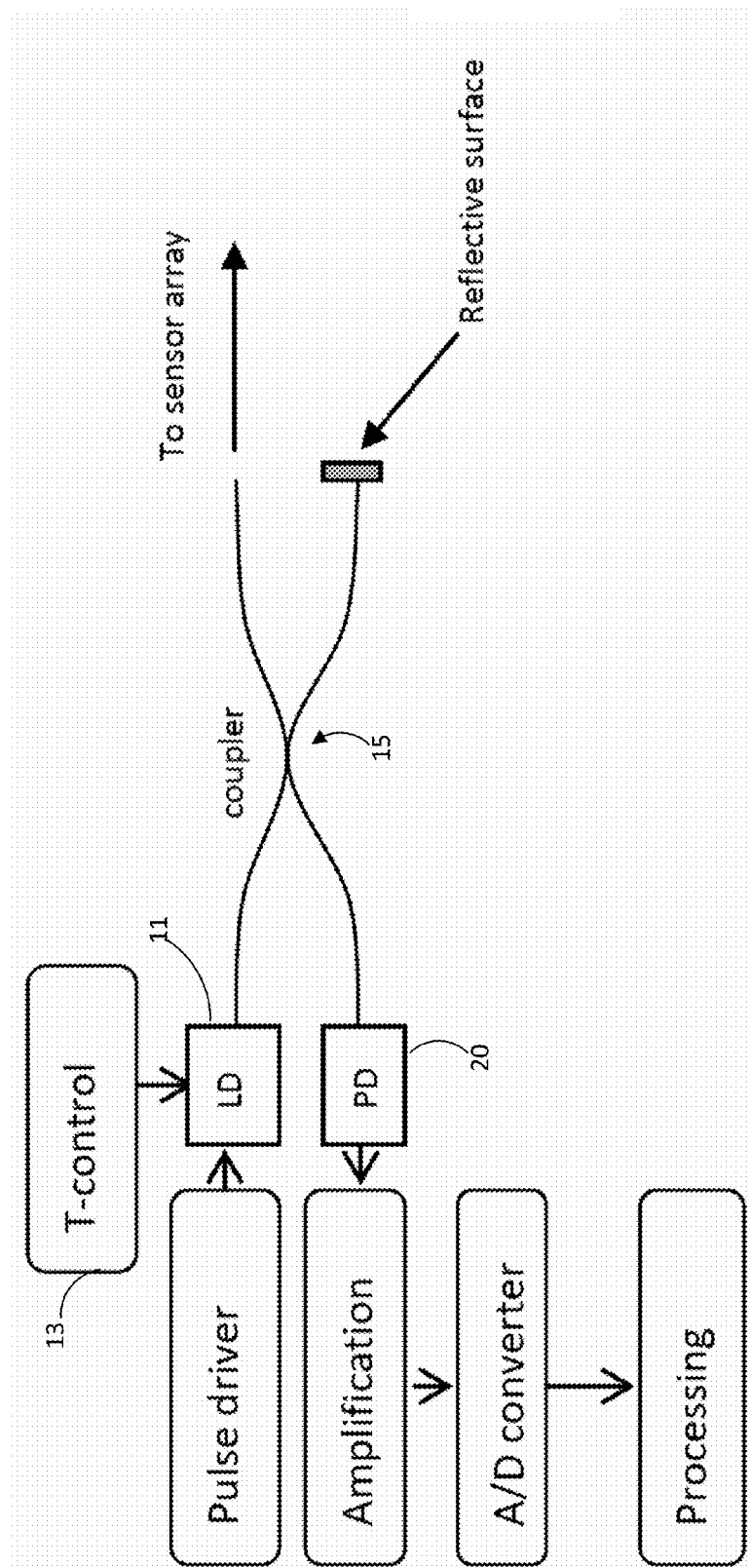

The basic unit of the apparatus 1 consists of a single module 10, interrogating a sensor array 55 of N FBG sensors 50 operating in one spectral window, located along a single optical fiber 30, as illustrated in FIG. 1A. Alternative configurations for the embodiment that uses a reference photodiode, as will be described below, are shown in FIGS. 6A-6C. Multiple modules 10 can be used concurrently by multiplexing their output using a wavelength division multiplexer 60, as shown in FIG. 2.

Each module 10 consists of a light source 11 with narrow spectral width (typically less than 1 GHz) made to repeatedly emit pulses of duration $\tau_p$, such that $\tau_p$ is shorter than the minimum travel time of light $\tau$ between consecutive FBG sensors 50 in the sensor array 55. The central wavelength of the emitted pulses is made to alternate between a high value $\lambda_+$ and a low value $\lambda_-$, the difference between $\lambda_+$ and $\lambda_-$ being much smaller than the spectral width of the FBG sensors 50 (so that pulses of wavelength $\lambda_+$ or $\lambda_-$ can both be reflected by a FBG sensor), but typically larger than the spectral width of each pulse (so that pulses of wavelength $\lambda_+$ or $\lambda_-$ can be spectrally distinguished). Thus one can also define an average wavelength $\lambda_{av}=(\lambda_++\lambda_-)/2$. Both $\lambda_+$, $\lambda_-$ and $\lambda_{av}$ should remain as stable as possible.

The pattern of alternating $\lambda_+$ and $\lambda_-$ pulses can be implemented in different ways. In one implementation, shown in the graph of FIG. 3A, pulses are emitted at time intervals T, such that T is larger than the total travel time of light between the first and last FBG sensor in the array, and alternate between $\lambda_+$ and $\lambda_-$.

In another implementation (not shown), bursts of a number of pulses at $\lambda_+$, emitted at intervals T, are followed by bursts of a number of pulses at $\lambda_-$.

Figure 4A:
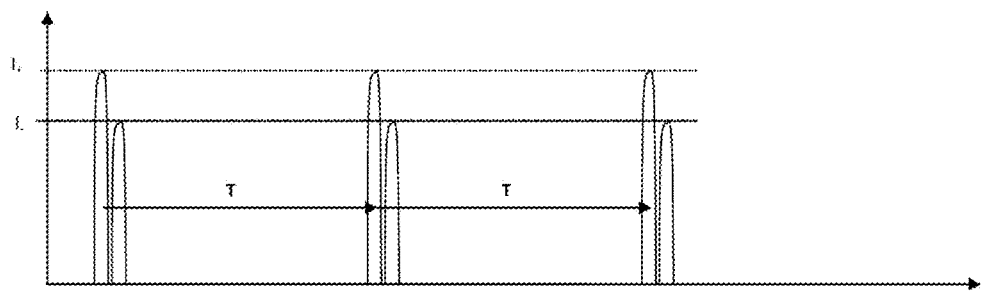
FIGS. 4A-4C are graphs illustrating emitted and reflected pulses intensity with respect to time, according to another embodiment.

In a third possible implementation, shown in the graph of FIG. 4A, two pulses are emitted within the time interval $\tau$, one at $\lambda_+$ followed by one at $\lambda_-$. For the third implementation, $\tau_p$ has to be smaller than $\tau/2$. The two pulses can be distinct, but can also be merged into a single pulse having average wavelengths $\lambda_+$ and $\lambda_-$ in its first and second half, respectively (i.e., the initial wavelength starts close to $\lambda_+$ and ends close to $\lambda_-$). For best results, the time between $\lambda_+$ and $\lambda_-$ pulses or bursts of pulses should be much shorter than the time it takes for the measurand to change by a meaningful value.

The light pulses are launched into an optical fiber 30. According to an embodiment, the light source 11 is a fiber coupled, temperature-stabilized DFB laser diode (LD in FIG. 1), driven by current pulses of alternating high and low peak current. Since it is known that the central wavelength of light emitted by such a DFB laser diode is related to the driving current, pulses with different peak currents will therefore have a different central wavelength. The DFB laser diode assembly may generally include an optical isolator to block the reflected light from getting back into the laser diode, and an internal photodiode that monitors the emitted light.

Following the fiber-coupled source, an optical fiber coupler 15 or an optical circulator is inserted. It allows the reflected light to be redirected onto a photodetector 20 (PD in FIG. 1A). Various other optical fiber components (C used as a generic symbol in FIG. 1) may be inserted between the optical fiber coupler 15 and the sensor array 55, such as the wavelength division multiplexer 60, connectors, fiber optic rotary joints 70, add/drop multiplexers 65 (shown in FIG. 2).

If an optical fiber coupler 15 is used instead of a circulator, the second branch of the optical fiber coupler 15 may contain a reference FBG sensor, as will be described below.

Figure 5A:
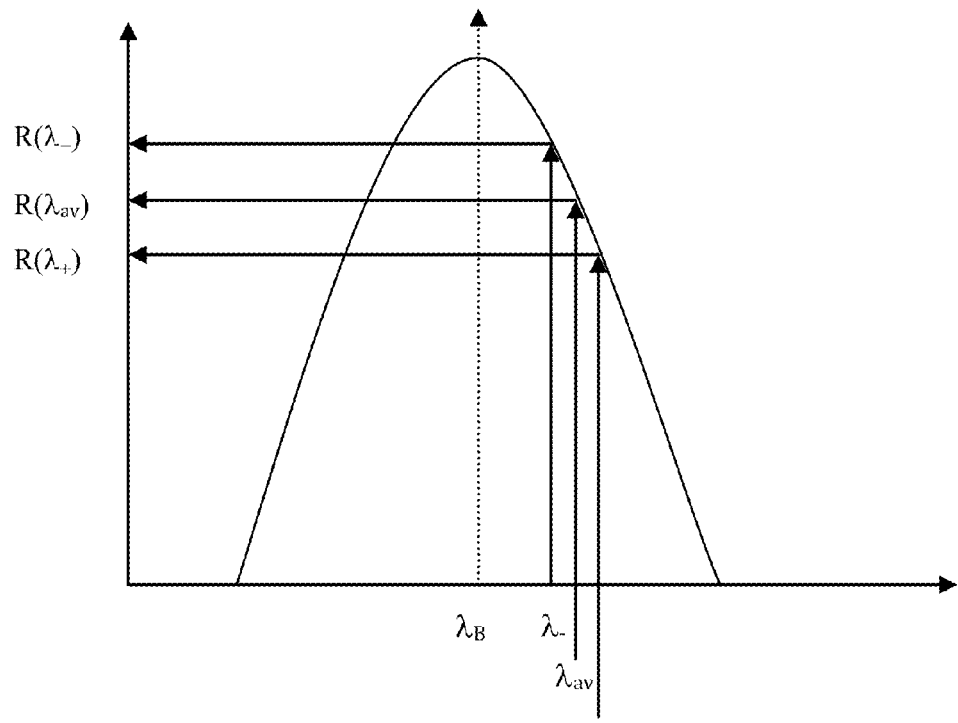
FIGS. 5A and 5B are graphs illustrating examples of a reflection spectrum of a FBG.
Figure 5B:
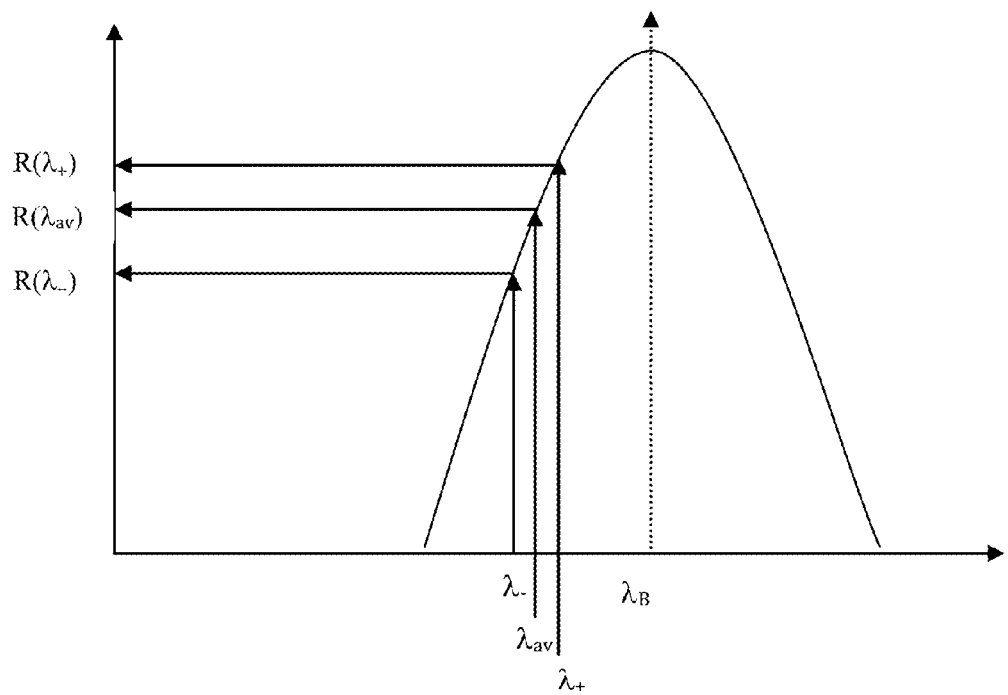

The N FBG sensors 50 which make up the sensor array 55 are fiber Bragg gratings 50 with a reflection spectrum that falls within a spectral window, which is defined as the wavelength range covered by the FBG central wavelength over the range of possible values of the measurand. The average wavelength of the pulses $\lambda_{av}$ is located more or less at the center of that spectral window. As in other TDM schemes, the maximum reflectivity of the FBG sensors 50 is made to be small enough that multiple reflections (resulting from the reflection on more than one FBG sensor) are considered negligible. Typically, it means that the maximum reflectivity lies in the range of 1-2%. Thus the FBG sensors 50 reflect the light pulses, but the reflectivity for each sensor depends on the value of the measurand at each sensor location, since the measurand affects the central wavelength of the FBG reflection spectrum. Pulses of different wavelengths $\lambda_+$ and $\lambda_-$ will also be reflected with different intensities, because their wavelength is at a different location within the FBG reflection spectrum. This is illustrated in FIGS. 5A and 5B, which show the FBG spectrum, as well as the location of $\lambda_+$, $\lambda_-$ and $\lambda_{av}$ within the FBG spectrum, and the corresponding reflectivity, for two different values of $\lambda_B$.

Figure 3A:
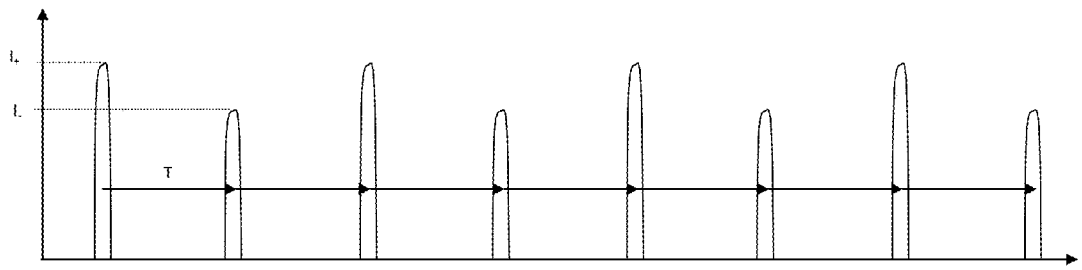
FIGS. 3A to 3C are graphs illustrating the intensity of emitted and reflected pulses with respect to time, according to an embodiment.
Figure 3B:
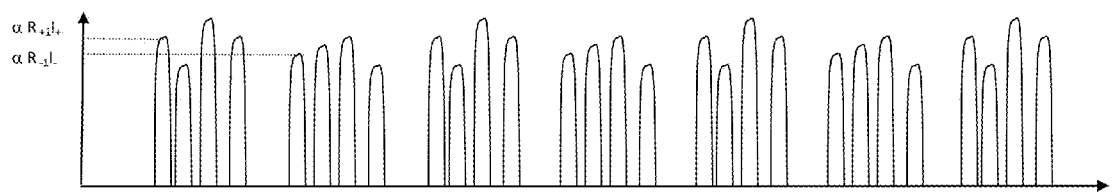
Figure 3C:
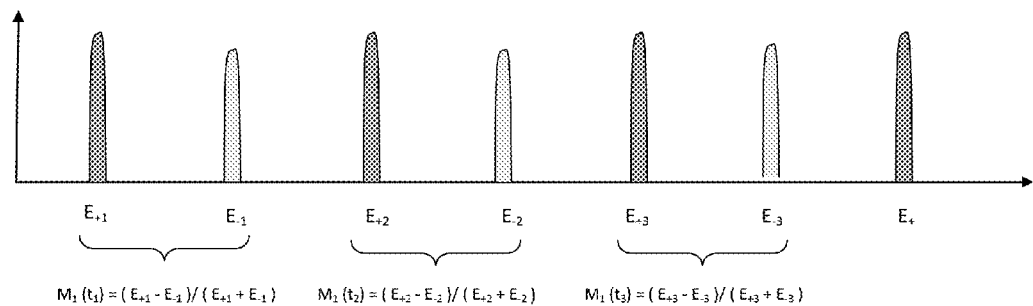

For each emitted pulse, the reflected signal thus consists in a series of N pulses, N being the number of sensors in the array, with a delay τ between each pulse being equal to the travel time of light between each FBG sensor 50. Since that delay τ is always larger than $\tau_p$ (pulse duration), the reflected pulses are temporally distinct. This is illustrated in FIGS. 3A-3C, in a case where, for each emitted pulse as seen in FIG. 3A, there would be 4 such reflections (N=4) as seen in FIG. 3B, and where the wavelength alternates from pulse to pulse ($\lambda_+$,$\lambda_-$), as well as the peak intensity ($I_+$,$I_-$). The graph of FIG. 4A shows a pattern of alternating $\lambda_+$ and $\lambda_-$ pulses that also have different peak intensities, which is likely to be the case if one uses DFB laser diodes with different peak current in order to vary the wavelength of the pulses. The graph of FIG. 3B shows the reflected echoes for a case where there would be an array of 4 FBGs along the fiber.

Figure 4B:
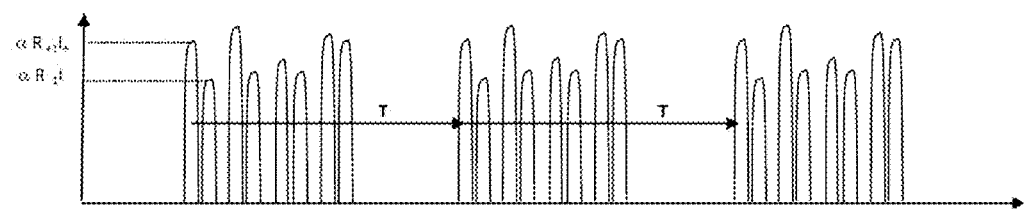

For the case where the two pulses are emitted within a time τ, illustrated in the graph of FIG. 4A, the reflected pulses are corresponding pairs of pulses, as shown in the graph of FIG. 4B.

The reflected echoes from the N FBG sensors 50 pass through the optical fiber coupler 15 or circulator, and are redirected onto a photodetector 20, where the optical signal is converted into an electronic signal. The response time of the photodetector 20 and electronic amplifying circuit 25 is made to be substantially shorter than the pulse duration, so that the amplified electronic signal is a faithful temporal reproduction of the optical signal.

The determination of the measurand value for each sensor in the FBG array is accomplished by an electronic and numerical processing of this electronic signal, as described below.

For the purpose of this description, the FBG sensors 50 must have a specially designed and well characterized spectral response. Standard FBGs typically have a reflection spectrum with a peak reflection at a central wavelength $\lambda_B$, and sidelobes on each side of the central peak. However, for the purpose of this description, the shape of the reflection spectrum according to an embodiment is a gaussian function with no sidelobes. Such gaussian-shaped FBGs can be fabricated by a number of techniques known to a person skilled in the art. For such a function, a spectral bandwidth $\Delta\lambda_B$ can be defined as the range of wavelengths where reflectivity is greater than 50% of the maximum reflectivity.

The effect of the measurand is to shift the central wavelength $\lambda_B$. The measurand can be temperature, strain, or any other environmental condition which modifies the reflection spectrum of FBG sensors. Over the measurement range targeted by the sensor, that wavelength will shift by a maximum amount $\Delta\lambda_{MAX}$. Given that the light source 11 used to interrogate a given sensor has a narrow optical spectrum centered on a wavelength $\lambda_{av}$, one must design the central wavelength of the FBG sensors 50 and the width of their reflection spectrum in such a way that at both extremities of the measurement range, the FBG reflectivity is large enough to result in an acceptable signal-to-noise ratio. As a rule of thumb, one may design the FBG sensors 50 such that reflectivity is always greater than 50% of the maximum over the entire measurement range, in which case one will chose $\lambda_B$ to be equal to $\lambda_{av}$ at the center of the measurement range, and $\Delta\lambda_{MAX}$ to be equal to $\Delta\lambda_B$. Nevertheless, it will be recognized that the reflected signal of the apparatus presently described will in general be much higher than with the use of a broadband source, which facilitates detection with a high signal-to-noise ratio.

Once the reflected signal has been converted to an electronic signal, the electronic and numerical processing that is performed to extract the value of the measurand for each sensor can be accomplished in a variety of ways, all known in the art. Therefore, details of all possible ways to perform such processing will not be given herein. All such methods rely on measuring the peak intensity or integrated energy of each individual echo pulse, and applying algorithms to such measured values. According to an embodiment, the sequences of N pulses are digitized by an ADC chip (analog-to-digital converter). Once digitized, the integrated energy of each echo pulse can be calculated by integrating the signal over the temporal window of duration τ associated with each echo. The N values thus obtained for each emitted pulse are then processed by a microprocessor, which can be a fast CPU chip or an FPGA chip, programmed to perform treatment comprising a series of steps to extract the values of the measurands for each FBG sensor 50 in the array.

This mathematical treatment is based on the following method. As described above, the pulses launched into the optical fiber 30 are of two types: those of higher and lower wavelengths, respectively $\lambda_+$ and $\lambda_-$. If a DFB laser diode is used, with different peak driving current for each type of pulse, then the peak optical intensity of each pulse will also be different, and is labeled as $I_+$ and $I_-$, respectively. Assuming that the round-trip transmission loss α between the light source 11 and the FBG sensors 50 remains constant or nearly constant between the time of emission of both types of pulse, and also that the value of the measurand does not change in a significant way between each pulse, then the reflected pulse intensities relative to emitted pulse intensity for both types of pulses will differ only by the difference in reflectivity due to different central wavelengths $\lambda_+$ and $\lambda_-$ of the first and second pulse types, as illustrated in FIGS. 5A-5B. This is due to the fact that the FBG reflectivity is a function of wavelength. If the reflectivity of the FBG as a function of wavelength is given by the function R(λ), then the difference D between the peak reflected intensity of the first and second pulse types is:

$$D = \alpha^*[I_+{}^*R(\lambda_+) - I_-{}^*R(\lambda_-)] \qquad (1)$$

On the other hand, the sum S of the intensities is:

$$S = \alpha^*[I_+{}^*R(\lambda_+) + I_-{}^*R(\lambda_-)] \qquad (2)$$

The ratio A between these two quantities, defined as A=D/S, is:

$$A = [I_+{}^*R(\lambda_+) - I_-{}^*R(\lambda_-)] / [I_+{}^*R(\lambda_+) + I_-{}^*R(\lambda_-)] \qquad (3)$$

Defining the ratio $C = I_-/I_+$, then equation (3) can be rewritten as:

$$A = [R(\lambda_+) - C^*R(\lambda_-)] / [R(\lambda_+) + C^*R(\lambda_-)] \qquad (4)$$

It can be seen that this ratio is independent of the transmission loss α. For constant laser driving conditions, the ratio C is constant and, in principle, is a known quantity. Therefore, the quantity A is strictly a function of the shape of the reflectivity spectrum R(λ) of the FBG, and the value of A depends on the difference between $\lambda_{av}$ and the central wavelength of the FBG sensor $\lambda_B$. If the shape R(λ) is such that the function given by eq. (4) is single-valued over a range of wavelengths corresponding to the measurement range (the spectral window), then the value A can be uniquely attributed to the difference between the central wavelength of the FBG, $\lambda_B$, and the average wavelength of the two types of pulses, $\lambda_{av}$. Since $\lambda_{av}$ is kept constant, A only varies with $\lambda_B$ and can therefore be related to the measurand.

Having a knowledge of the ratio C, one can also calculate a normalized value B, given by:

$$B=[R(\lambda_+)-R(\lambda_-)]/[R(\lambda_+)+R(\lambda_-)] \quad (5)$$

As will be shown below, the quantity B can be directly related to the derivative of the spectral shape of the FBG reflection spectrum.

Either quantity A or B may be used to relate the measurement of the reflected pulse intensities to the measurand. For reasons that are explained below, the quantity B is preferable.

To illustrate how this is achieved in practice, let's take the simple example where the shape of the grating spectrum is a gaussian function, expressed as:

$$R(\lambda)=R_{max}\exp(-4\ln(2)(\lambda-\lambda_B)^2/\Delta\lambda_B^2) \quad (6)$$

$R_{max}$ is the peak reflectivity, $\lambda_B$ is the peak wavelength, and $\Delta\lambda_B$ is the full width at half maximum of the gaussian spectrum. Since the difference between $\lambda_+$ and $\lambda_-$ is much smaller than the width of the spectrum $\Delta\lambda_B$, the difference between $R(\lambda_+)$ and $R(\lambda_-)$ can be approximated as the derivative of the function $R(\lambda)$ at a wavelength $\lambda_{av}$, multiplied by the wavelength difference between $\lambda_+$ and $\lambda_-$, expressed as $\delta\lambda$. On the other hand, the denominator in eq.(5) can be approximated to be twice the reflectivity at the average wavelength $\lambda_{av}$, i.e., $R(\lambda_+)+R(\lambda_-)\approx 2R(\lambda_{av})$. Using the function of eq. (5), one then gets:

$$B=-4\ln(2)R_{max}\delta\lambda(\lambda_{av}-\lambda_B)/\Delta\lambda_B^2 \quad (7)$$

As can be seen, B is then a linear function of $(\lambda_{av}-\lambda_B)$ over the entire spectrum. Other shapes than gaussian for $R(\lambda)$ can be used, but they do not result in a linear function for B. A linear response simplifies calibration, and the fact that B is single-valued for any value of $\lambda_B$ prevents ambiguous measurements. Therefore, the gaussian shape is one which works well. However, should the shape deviate from an ideal gaussian shape, prior knowledge of the spectral shape of each grating can be used to generate calibration curves.

The quantity B can be calculated either using the peak intensity of the pulses or their integrated energy. However, the latter is preferable because it is less prone to noise. Furthermore, B can be averaged over a number of pulses to further reduce noise.

In practice, the ratio C may vary either from pulse to pulse, or due to a slow drift in the driving electronics. To ensure that the proper value of C is used in calculating the values of B, it is advantageous to measure it in real time. This can be achieved by directly measuring the pulses emitted by the laser diode, which are used as references to normalize the signals reflected by the FBG's. Three possible ways of performing that measurement are illustrated in FIGS. 6A-C.

In a first embodiment, a photodiode 120 can be inserted at the output of the second branch of the optical fiber coupler 15 (FIG. 6A). The second embodiment (FIG. 6B) uses the internal photodiode 120 in the laser diode package. A third embodiment (FIG. 6C) uses the reflection from the end face of the second branch of the optical fiber coupler 15, or any reflective device inserted there, which is then detected by the same photodetector 20 that detects the echoes from the sensor array 55. In the latter case, the length of fiber between the fiber coupler and the reflective surface must be adjusted such that the reflected pulse arrives on the photodiode at a different time than all the other echoes from the sensor array. Those reference pulses, after detection and amplification, are similarly amplified and digitized to provide either a peak value, or an integrated value, similar to the echo pulses. Other equivalent embodiments can provide similar results.

After digitization of a sequence of N pulses at wavelengths $\lambda_+$, the integrated energy $E_{+i}$ can be calculated for each $i^{th}$ pulse in the sequence by integrating the digitized values over the temporal window of each pulse. This is done for the sequence of pulses at wavelengths $\lambda_-$ give $E_{-i}$. The same procedure is applied to the reference pulses, which gives values $E_{ref+}$ and $E_{ref-}$. If bursts of pulses at $\lambda_+$ are followed by bursts of pulses at then the integrated energies for each individual pulses are averaged over the number of pulses in the bursts. The N values of $B_i$ for each of the $i^{th}$ pulses are then extracted from those values by calculating:

$$B_i=((E_{+i}/E_{ref+})-(E_{-i}/E_{ref-}))/((E_{+i}/E_{ref+})+(E_{-i}/E_{ref-})) \quad (8)$$

Figure 4C:
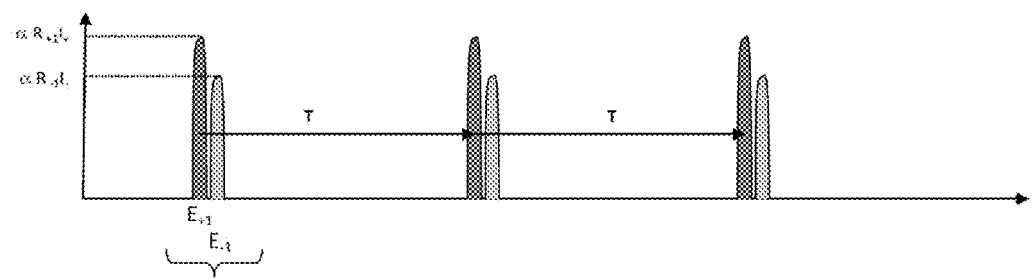

This is illustrated in the graphs of FIGS. 3C and 4C, where the shaded areas correspond to the integrated energy of the first pulses in the sequence. As described above, the values $B_i$ can be directly related to the value of the measurand for the $i^{th}$ FBG sensor in the array.

Figure 2A:
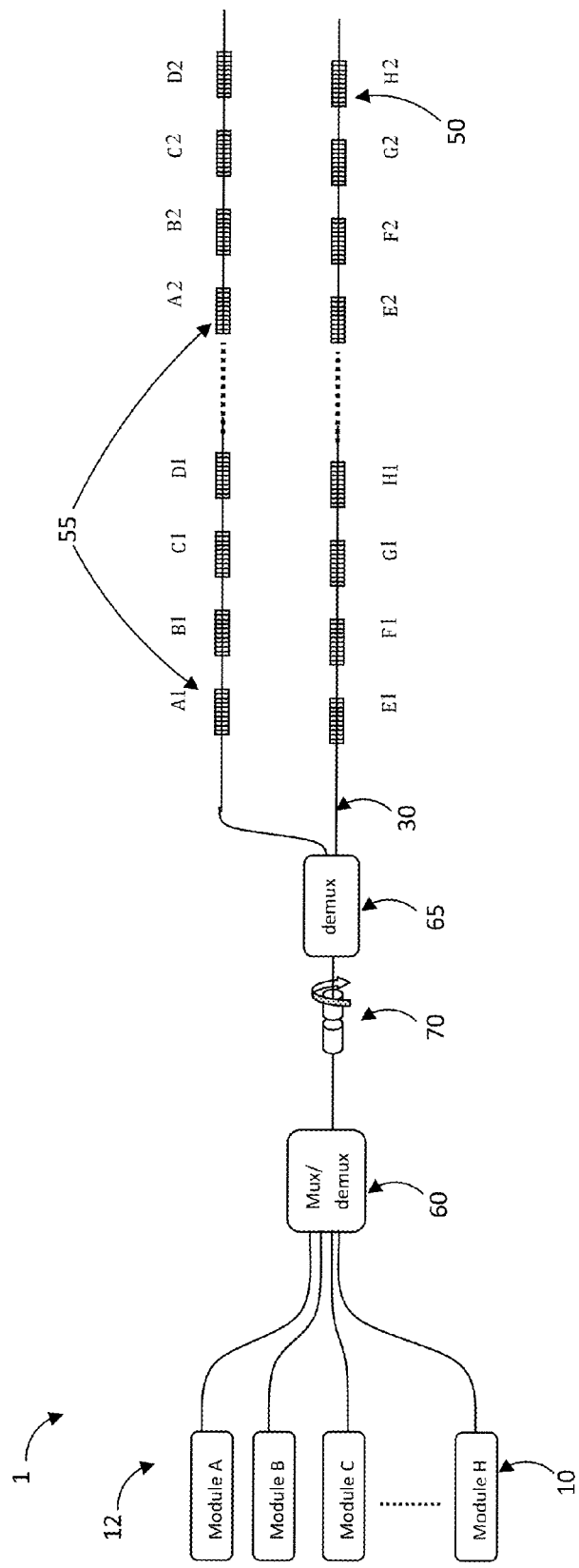
FIG. 2A is a diagram illustrating the apparatus comprising multiple modules interrogating multiple serial arrays of FBG sensors located along multiple optical fibers, according to an embodiment.
Figure 2B:
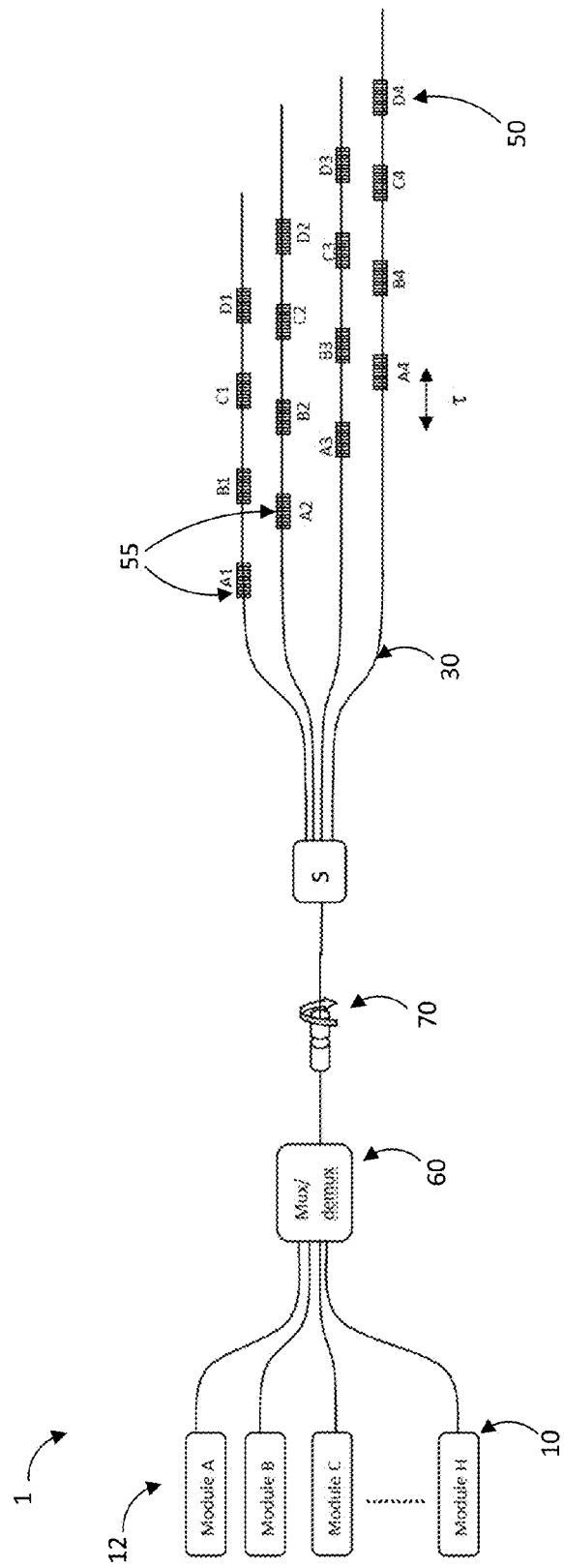
FIG. 2B is a diagram illustrating the apparatus comprising multiple modules interrogating multiple parallel arrays of FBG sensors located along multiple optical fibers, according to an embodiment.

The module 10 described above can be used as a stand-alone apparatus, to measure a sensor array 55 of N FBG sensors 50. However, multiple modules 10 having light sources 11 at different wavelengths $\lambda_{av}$ can be used to independently interrogate multiple sensor arrays 55 of FBG sensors 50, accessed via a single optical fiber 30. The spacing between the wavelengths of the various sources must be larger than the spectral window. This is accomplished by multiplexing the outputs of the multiple modules 10 into a single optical fiber 30, with a wavelength division multiplexer 60. For example, and according to an embodiment, the light source 11 comprises laser diodes which can be of the type used for so-called Coarse Wavelength Division Multiplexing systems (CWDM), which is an established standard for optical telecommunications systems. Such diodes have wavelengths separated by 20 nm, between 1270 and 1610 nm, providing 18 different channels. Off-the-shelf multiplexers are commercially available to combine up to 16 of those channels into a single fiber. The multiplexing configuration (60, 65) is illustrated in FIG. 2A. A 20 nm spacing is large enough to accommodate most practical spectral windows. Therefore the maximum capability of the apparatus 1 does not depend on the value of the spectral window. Furthermore, the standardized wavelengths mean that the FBG sensors 50 can also have a standardized design, which lowers manufacturing costs.

One advantage of having all the light sources 11 combined into a single optical fiber 30 is that all the FBG sensors 50 can be inscribed along a single fiber. Thus the maximum number of FBG sensors 50 along that optical fiber 30 is the product of the maximum number of sensors interrogated by each module 10, times the number of modules 10.

However, one other advantage is that all the sensors can be addressed via a single entry point for the optical fiber 30, passed which the light from different modules 10 can be redirected into side branches. For example, if one wants to measure the temperature or strain at multiple locations in a rotating equipment, such as the rotor of a generator, then a fiber optic rotary joint 70 located on the axis of the rotor can be used between the interrogator 12 and the sensors, as illustrated in FIG. 2A. Passed the fiber optic rotary joint 70, different wavelengths can be sent onto separate branches from the main fiber, with the use of add/drop multiplexers 65. Such devices can either extract one channel (at one wavelength) and launch it into another fiber, or extract a group of channels. For example, 8 out of 16 channels can be sent into a separate branch, or 4 out of 8 channels, as illustrated in FIG. 2A. According to another embodiment shown in FIG. 2B, a wavelength independent fiber splitter can be used to distribute all the wavelengths from the different modules more or less equally among multiple optical fibres that comprise multiple parallel arrays of sensors, each interrogated by a different module. This has the advantage of providing redundancy in case of failure or breakage of one of the branches. Having all interrogating signals in the same fiber is also advantageous if the interrogator 12 is located at a large distance from the FBG sensors 50.

Figure 8:
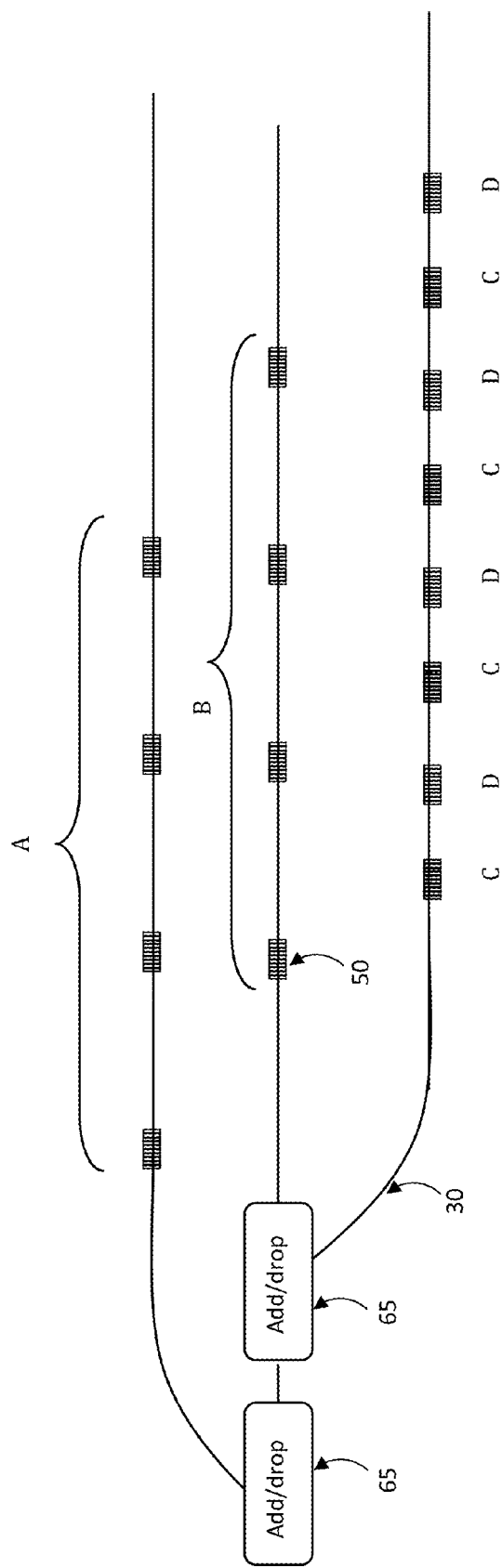
FIG. 8 is a diagram illustrating how add/drop multiplexers can be used to launch signals from one or more modules into separate branches, according to an embodiment.

Thus the modular architecture of the apparatus 1 offers a lot of flexibility. Various configurations for locating the FBG sensors 50 are shown in FIGS. 7A-7C. The modules 10 operate independently, and the associated sensor arrays 55 can all have different characteristics, such as different distance between sensors, or different spectral width of the FBG sensors 50. The latter determines the measurand range, but also its resolution. Thus sensors with large span and low resolution can be combined with sensors of small span but high resolution. The sensor arrays 55 can be interleaved with regular spacing (FIG. 7A), or bunches of sensors from different arrays bundled with close spacing, at regular intervals, which can provide higher spatial resolution (FIG. 7B). Or else the sensor arrays 55 can be concatenated one after the other (FIG. 7C). The modular nature of the apparatus 1 also means that the cost is incremental with the number of modules used. FIG. 8 shows how add/drop multiplexers 65 can be used to launch signals from one or more modules 10 into separate branches.

DFB laser diodes can be made to generate pulses of 1 nanosecond or even less. Thus the minimum spacing between sensors for one array can be as small as 10 cm. The speed of the electronic processing ultimately limits that spacing. Because signal is lost on each reflection, a limited number of sensors can be used in one array, typically about 15. Since as many as 16 channels can be combined with off-the-shelf multiplexers, the maximum capability of the apparatus 1 can be as high as 240 sensors.

Since the wavelength emitted by the laser diode is a function of the temperature, a good temperature control 13 of the diode is required. This can be achieved with a thermoelectric cooling element, using the signal from a temperature sensor located close to the diode as an error signal, in a manner that is well known to the art. For long term stability, it is important that the central wavelength of the diode $\lambda_{av}$, as well as the difference in wavelength $\delta\lambda$ between the two types of pulses remain constant in time or, if they are not, that their value be monitored and used to correct the calibration of the instrument. Laser diodes are known to age over time, therefore these two values are likely to drift slowly over time. To account for long term drift of the central wavelength, and of the value $\delta\lambda$, it is beneficial to use a reference sensor that is well calibrated and known to be stable in time. The reference sensor can itself be a fiber Bragg grating of similar design to the other sensors, but whose temperature and strain are known with good accuracy. This can be achieved by measuring the FBG temperature with a another precision temperature sensor such as a thermistance, or else by maintaining the FBG at a stable temperature and strain, in manners known in the art.

The nature of TDM interrogation allows the interrogation of such a reference sensor simultaneously with the other sensors in the array. For this, the sensor has to be located at a distance from the interrogation unit that is such that the echo from the reference grating uses one of the available temporal windows. This is done by adjusting the distance from the source to the reference sensor. The reference sensor can be located in the second branch of the optical fiber coupler 15, as long as its position is such that the echo falls within one of the temporal windows.

From the embodiments described above, it will be understood that the each FBG sensor 50 has a known reflection spectrum, also known as a reference reflection spectrum, which can shift under given environmental conditions applied to each one of the FBG sensors 50, thereby defining a shift for each one of the FBG sensors 50. Each one of the FBG sensors 50 is located at a different distance of the light source 11 and the receiver (there is spacing between each one of them among a given array 55), thereby allowing the receiver to temporally discriminate each reflected pulse received from the FBG sensors 50 from a given array.

When more than one array 55 is used, FBG sensors 55 of different arrays 55 can be at the same distance from the light source 11 and from the receiver than another FBG sensor 50 of another array 55. Therefore, there is a need for a spectral separation between each one of the arrays 55, i.e., the FBG sensors 50 of a given array 55 all respond inside a given spectral window. Spectral windows characterizing different arrays 55 should not overlap. Therefore, the receiver, when receiving a reflected pulse, is able to unambiguously identify the FBG sensor 50 on which the pulse was reflected based on the time at which it was received and on the spectral window characterizing the reflected pulse.

Since each array 55 is made to reflect in a given spectral window, there must be an interrogator adapted to emit at a wavelength corresponding to the given spectral window, and avoiding using broadband or tunable sources, as mentioned above in the background section. Therefore, each one of the arrays 55 has a corresponding light source 11. The light source 11 corresponding to an array 55 is adapted to emit within the spectral window of its corresponding array. Therefore, each one of the arrays 55 and its corresponding light source 11 operates in their respective spectral window.

As described above, the light source 11 does not need to emit on a continuous range of wavelengths to get a "picture" of the reflected pulse, as performed in the prior art. Since the shape of the reference reflection spectrum is known for each FBG sensor 50, and since the shift is known to be relatively small (smaller than the spectral window of the FBG sensor 50), only a discrete number of points on the actual (shifted) reflection spectrum need to be interrogated. In the embodiments described above, the shape was known to be (at least approximately) a gaussian shape, for which only two points in the actual (shifted) reflection spectrum needed to be determined in order to calculate the shift of the actual reflection spectrum with respect to the reference (known) reflection spectrum. More complex reflection spectra could require a different number of wavelengths for unambiguous determination of the shift.

For this reason, each light source 11 does not emit on a whole spectral window but rather emits a discrete number of wavelengths (such as $\lambda_+$ and $\lambda_-$ above) within the respective spectral window of the light source 11. Since both $\lambda_+$ and $\lambda_-$ are within this spectral window, one can formalize the situation by defining an average wavelength $\lambda_{av}$ about which $\lambda_+$ and $\lambda_-$ (or other wavelengths if there are more than two) are emitted. Therefore, each light source 11 is characterized by its respective average wavelength within the respective spectral window of the corresponding one of the arrays 55, about which a given number of discrete wavelengths (e.g., 2) are emitted.

Pulses reflected by each FBG sensor 50 are received at a given time and wavelength which are used to unambiguously identify the FBG sensor 50 which reflected that pulse. The reflected pulse is also indicative of how much the actual reflection spectrum of a given FBG sensor 50 shifted from its reference reflection spectrum (i.e., the shift of each FBG sensor 50). It is therefore also indicative of the conditions prevailing for this FBG sensor 50. The shift for each FBG sensor 50 can be calculated as explained above. The conditions prevailing at a given FBG sensor 50 can also be retrieved via the shift using a calibration table.

While embodiments have been described above and illustrated in the accompanying drawings, it will be evident to those skilled in the art that modifications may be made without departing from this disclosure. Such modifications are considered as possible variants comprised in the scope of the disclosure.

The invention claimed is:

1. A sensor apparatus comprising:
   an interrogator comprising light sources, each one of the light sources emitting pulses having either a first respective wavelength or a second respective wavelength about a respective average wavelength of the each one of the light sources; and
   FBG sensor arrays, each one of the FBG sensor arrays corresponding to one of the light sources and comprising a plurality of FBG sensors on an optical fiber and being for reflecting the pulses,
   wherein FBG sensors of a given FBG sensor array have a spatial separation therebetween which is sufficient to allow, at a receiver, a temporal discrimination between reflected pulses produced by each one of the FBG sensors of a given FBG sensor array;
   wherein each one of the FBG sensor arrays has a respective spectral reflection window having a reflection spectrum with sides, the respective spectral reflection window comprising the respective average wavelength of the corresponding one of the light sources, wherein the first respective wavelength and the second respective wavelength have a difference substantially smaller than the spectral width of the FBG sensors that allows both the first respective wavelength and the second respective wavelength to be on a same side of the reflection spectrum;
   wherein the respective average wavelengths of the light sources have a spectral separation therebetween which is sufficient to allow, at the receiver, a spectral discrimination between reflected pulses from each one of the FBG sensor arrays.

2. The sensor apparatus of claim 1, wherein the receiver comprises a processor adapted, for each one of the FBG sensor arrays corresponding to one of the light sources and based on prior knowledge of a reference reflection spectrum of the each one of the FBG sensors, to use the reflected pulses from the first respective wavelength and the second respective wavelength to unambiguously determine a shift of the peak of an actual reflection spectrum of the each one of the FBG sensors.

3. The sensor apparatus of claim 1, wherein the FBG sensor arrays are provided on a plurality of optical fibers, each one of the optical fibers holding a given number of FBG sensor arrays.

4. The sensor apparatus of claim 3, further comprising a multiplexer for connecting the plurality of optical fibers thereto, the interrogator being optically coupled to the multiplexer for sending the pulses to the plurality of optical fibers.

5. A sensor apparatus comprising:
   an interrogator comprising a light source emitting pulses having either a first respective wavelength and a second respective wavelength about an average wavelength; and
   a fiber Bragg grating (FBG) arrangement comprising a FBG sensor array comprising a plurality of FBG sensors on an optical fiber and being for reflecting the pulses, thereby producing reflected pulses at each one of the FBG sensors,
   wherein FBG sensors of a given FBG sensor array have a spatial separation therebetween which is sufficient to allow, at a receiver, a temporal discrimination between the reflected pulses produced by each one of the FBG sensors;
   wherein the FBG sensor array has a spectral reflection window having a reflection spectrum with sides, the respective spectral reflection window comprising the average wavelength, wherein the first respective wavelength and the second respective wavelength have a difference substantially smaller than the spectral width of the FBG sensors that allows both the first respective wavelength and the second respective wavelength to be on a same side of the reflection spectrum.

6. The sensor apparatus of claim 5, wherein the receiver comprises a processor adapted, based on prior knowledge of a reference reflection spectrum of the plurality of FBG sensors, to use the reflected pulses from the first respective wavelength and the second respective wavelength to unambiguously determine an actual reflection spectrum of each one of the plurality of FBG sensors.

7. The sensor apparatus of claim 1, wherein the interrogator is a diode laser.

8. The sensor apparatus of claim 5, wherein the interrogator is a diode laser.

* * * * *